United States Patent
Howard et al.

(10) Patent No.: US 7,302,317 B2
(45) Date of Patent: Nov. 27, 2007

(54) SYSTEM AND METHOD TO ENHANCE ATTITUDE ESTIMATION FOR TRANSFER ORBIT MANEUVER

(75) Inventors: Danny D. Howard, Los Angeles, CA (US); Che-Hang Charles Ih, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 587 days.

(21) Appl. No.: 10/834,670

(22) Filed: Apr. 29, 2004

(65) Prior Publication Data

US 2005/0246074 A1   Nov. 3, 2005

(51) Int. Cl.
*B64C 1/00* (2006.01)
*G06F 17/00* (2006.01)

(52) U.S. Cl. .............. 701/13; 701/3; 701/203; 701/226; 244/158.1; 244/158.4; 342/352

(58) Field of Classification Search ........... 701/13, 701/213–214, 226, 3, 4, 203, 200; 342/26 R, 342/26 A, 352, 357.06, 357.15; 244/158.1, 244/158.4, 164, 171
See application file for complete search history.

(56) References Cited

U.S. PATENT DOCUMENTS

| | | | | |
|---|---|---|---|---|
| 4,161,780 A | * | 7/1979 | Rudolph et al. | 701/13 |
| 4,437,047 A | * | 3/1984 | Smay | 318/649 |
| 4,752,884 A | * | 6/1988 | Slafer et al. | 701/13 |
| 4,837,699 A | * | 6/1989 | Smay et al. | 701/13 |
| 4,961,551 A | * | 10/1990 | Rosen | 244/164 |
| 5,020,744 A | * | 6/1991 | Schwarzschild | 244/164 |
| 5,172,876 A | * | 12/1992 | Rahn | 244/164 |
| 5,452,869 A | * | 9/1995 | Basuthakur et al. | 244/164 |
| 5,922,033 A | * | 7/1999 | Milford et al. | 701/13 |
| 7,076,341 B2 | * | 7/2006 | Holt et al. | 701/4 |

* cited by examiner

*Primary Examiner*—Yonel Beaulieu
(74) *Attorney, Agent, or Firm*—Timothy K. Klintworth; Wildman, Harrold, Allen & Dixon, LLP

(57) ABSTRACT

A system and method to enhance attitude estimation for transfer orbit maneuvers of a spinning satellite includes a transfer orbit earth sensor that can receive and convert an infrared radiance to an analog signal. The analog signal is provided to a hardware chord processor and an analog-to-digital converter. The hardware chord processor determines an earth chord length based on the analog signal. The analog signal is sampled in the analog-to-digital converter to provide a digital signal to a digital earth sensor pre-processor, which reshapes the digital signal to provide a pre-processed signal having nearly distinct peaks. A software chord processor is provided with the pre-processed signal. The software chord processor locates the peaks in the pre-processed signal and determines an earth chord length.

22 Claims, 4 Drawing Sheets

SYSTEM AND METHOD TO ENHANCE ATTITUDE ESTIMATION FOR TRANSFER ORBIT MANEUVER

FIELD OF THE DISCLOSURE

The present disclosure is generally related to satellite orbital maneuvers, and more particularly, to a system and method to enhance attitude estimation for a transfer orbit maneuver.

BACKGROUND

To place a satellite in a required orbit, the location and attitude of the satellite in relation to the earth must be known. The attitude of the satellite is normally determined through use of sensors on board the satellite. Information from the on-board sensors may either be processed with on-board computers, or sent by telemetry to a ground station for processing to determine the orientation of the satellite in inertial space.

Generally, a satellite includes an earth chord sensor, which is an infrared sensitive device that detects the heat of the earth as the satellite spins and sweeps the sensor field of view across the earth to measure its chord. The earth chord sensor typically generates a near trapezoidal signal. An analog circuit may be used to generate and report time stamps when the output voltage of the earth chord sensor falls below a predetermined threshold at the leading edge of the earth and when the output voltage of the earth chord sensor rises above the same predetermined threshold at the trailing edge of the earth. The difference between the two time stamps indicates the approximate time it takes the satellite to sweep through the length of the earth.

Prior art systems for processing the output of the earth chord sensor effectively calculate the earth chord time as long as: 1) the satellite is spinning at a high enough rate; 2) the earth chord is short enough for the sensor to generate a near trapezoidal signal; and, 3) there is little system noise (e.g. DC bias, low frequency and high frequency noises). In particular, if the satellite is spinning at a low rate, the earth chord sensor generates a slightly irregular signal. At low spin rates, when the earth chord sensor first encounters the earth, the signal drops to a softly rounded negative voltage peak. The true leading edge peak may be somewhere in this rounded peak. As the field of view of the sensor sweeps across the earth, the signal gently transitions upward to another softly rounded voltage peak. The true trailing edge peak may be somewhere in this peak. When the earth entirely leaves the field view of the sensor, the signal slowly moves towards a zero voltage.

The true earth chord time for satellites is the time between the true leading edge peak and the true trailing edge peak. However, with the softly rounded voltage peaks in the signal from the earth chord sensor, the true leading edge peak and the true trailing edge peak may not be locatable by the analog circuit. U.S. Pat. No. 5,922,033 provides a method for determining earth chord times for a satellite spinning at a low spin rate. However, the technique in U.S. Pat. No. 5,922,033 presupposes a particular signal characteristic and cannot be used for a wide range of satellite spin rates. Therefore, there remains a need for a system and method for determining earth chord times for a satellite spinning at a range of spin rates including a low spin rate.

SUMMARY

A system for determining an earth chord time of a spinning satellite measuring an earth cord includes an earth chord sensor, an analog-to-digital converter, a digital earth sensor pre-processor, and a processor. The earth chord sensor is adapted to generate an analog signal from an earth radiance. The analog-to-digital converter is adapted to generate a digital signal from the analog signal of the earth chord sensor. The digital earth sensor pre-processor is adapted to generate a pre-processed signal from the digital signal generated by the analog-to-digital converter. The pre-processed signal generally includes a leading edge peak and a trailing edge peak. A processor is adapted to substantially detect the leading edge peak and the trailing edge peak and calculate a time difference between the leading edge peak and the trailing edge peak.

A method of determining an earth chord time of a spinning satellite measuring an earth chord includes digitizing an output signal of an earth chord sensor to provide a digitized output signal. The digitized output signal is pre-processed to provide a pre-processed signal. A leading edge peak and a trailing edge peak are detected in the pre-processed signal. A time difference between the leading edge peak and the trailing edge peak of the pre-processed signal is calculated.

A system for determining an earth chord time of a spinning satellite measuring an earth chord includes an earth chord sensor adapted to generate an analog signal, and an analog-to-digital converter adapted to generate a digital signal from the analog signal. A means for shaping the digital signal generally provides a leading edge peak and a trailing edge peak. A processor that is adapted to substantially detect the leading edge peak and the trailing edge peak calculates a time difference between the leading edge peak and the trailing edge peak.

The features, functions, and advantages can be achieved independently in various examples of the present disclosure or may be combined in yet other examples.

DETAILED DESCRIPTION

Figure 1:
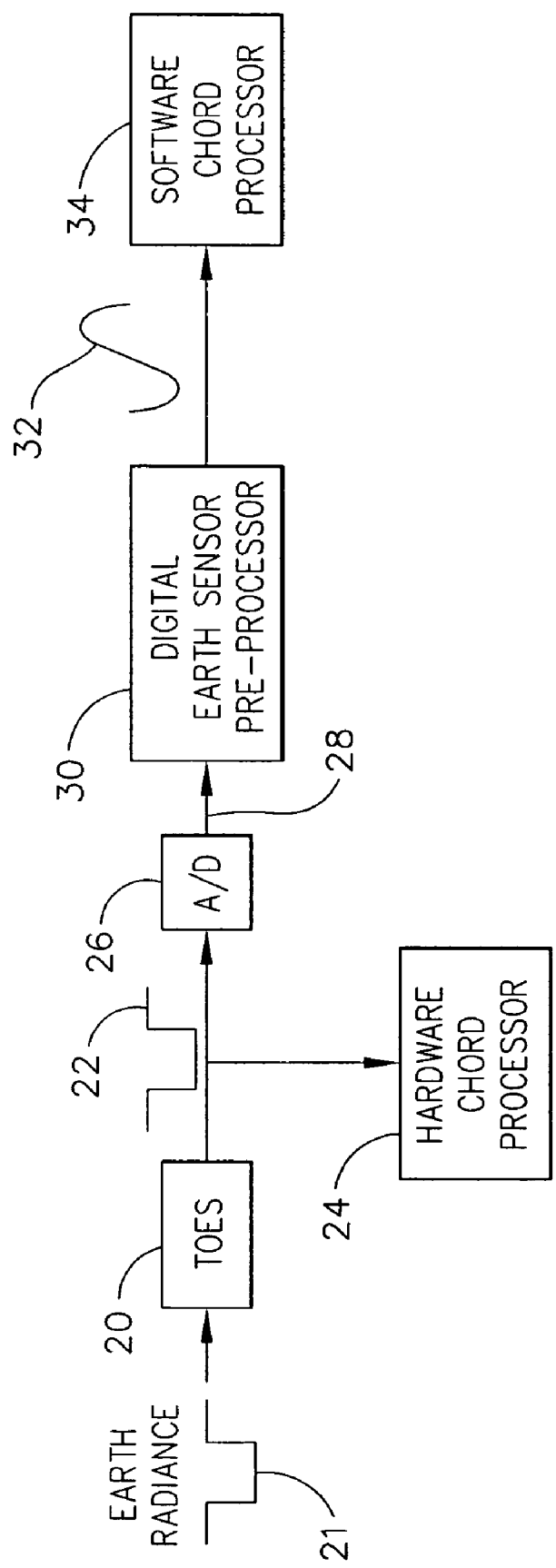
FIG. 1 is a block diagram of a system and method to enhance attitude estimation for transfer orbit maneuver in accordance with the teachings of the present disclosure.
Figure 3:
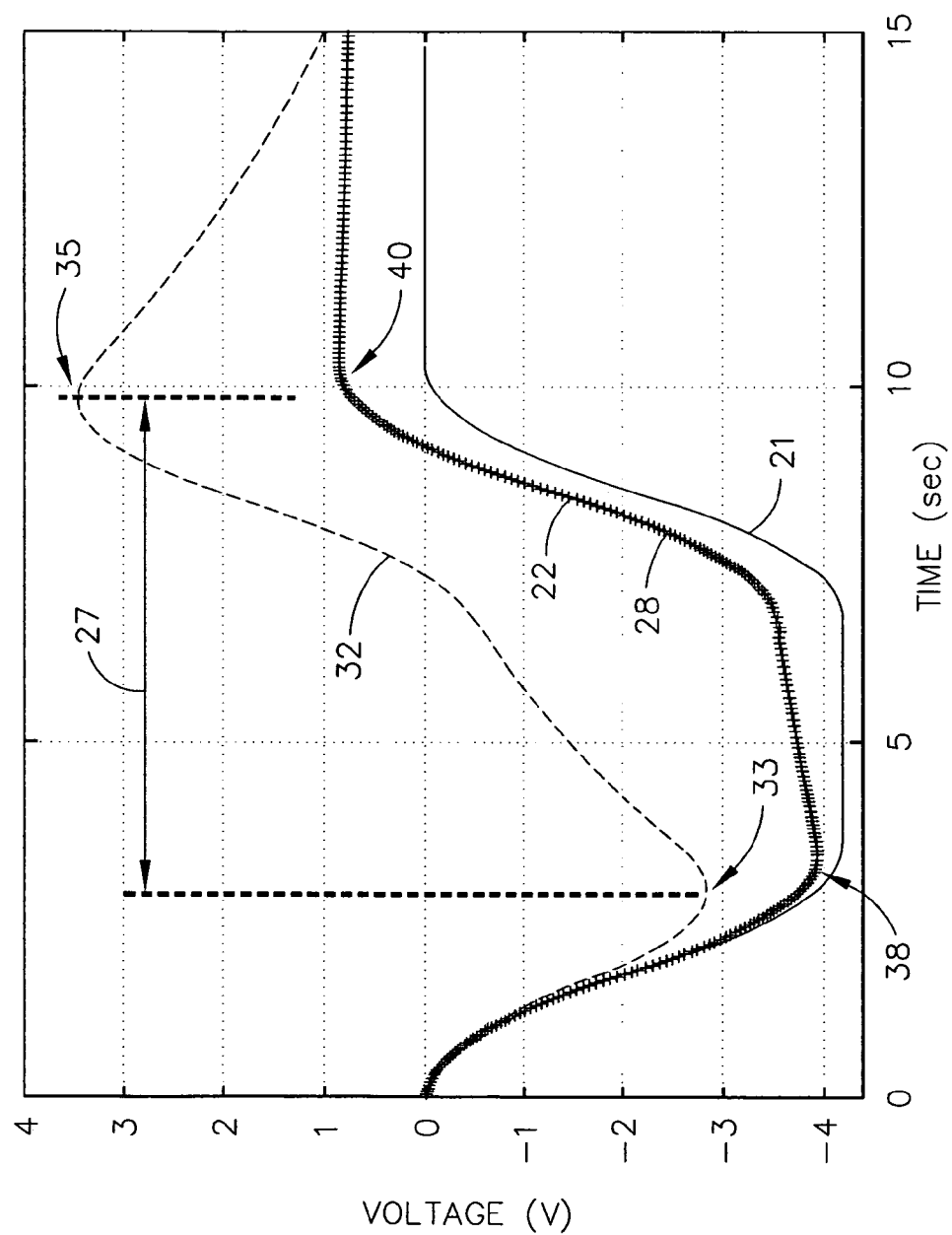
FIG. 3 is a chart illustrating a first example of the method of FIG. 1.

Referring to FIG. 1, a block diagram of a disclosed system utilizing a method to enhance attitude estimation for transfer orbit maneuver is generally shown. The disclosed system and method may be implemented in any type of spacecraft, including communication satellites. For example, a satellite may include a transfer orbit earth sensor (TOES) 20 that can receive and convert an infrared earth radiance 21 to an analog signal 22. Optionally, the satellite may include two or more TOES 20 positioned at different angles, the outputs of which can be processed simultaneously for added accuracy. The analog signal 22 from the TOES 20 can be provided to a hardware chord processor 24 and an analog-to-digital converter (A/D converter) 26. The hardware chord processor 24 may determine an earth chord time 27 based on the analog signal 22. The analog signal 22 can be sampled in the A/D converter 26 to provide a digital signal 28 to a digital earth sensor pre-processor (DESPP) 30. Referring to FIG. 3, the DESPP 30 can shape the digital signal 28 as will be explained in detail below to provide a pre-processed signal 32 having well-defined pre-processed peaks 33 and 35. The pre-processed signal 32 may be provided to a software chord processor 34. The software chord processor 34 can locate the pre-processed peaks 33 and 35 and determine the earth chord time 27 as will be described in the following.

Figure 2:
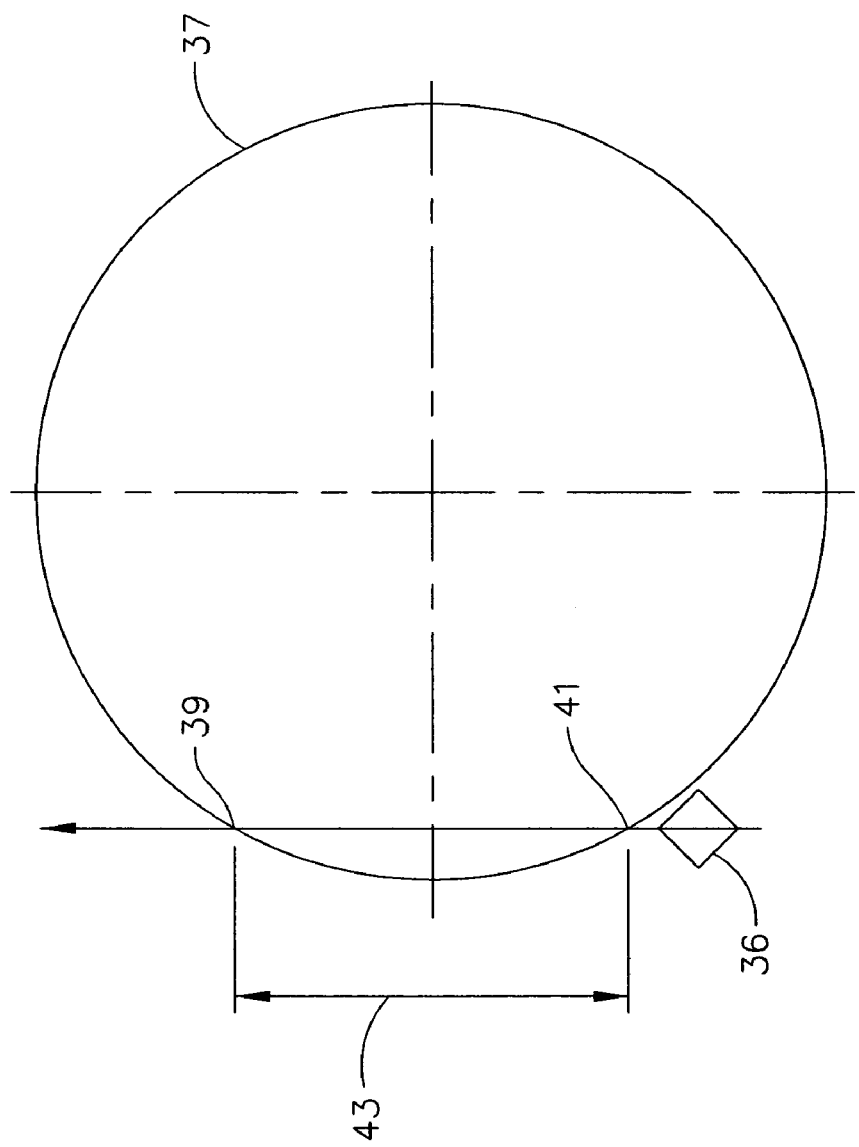
FIG. 2 is a diagram of a scan path of an earth chord sensor of the system of FIG. 1.

Referring to FIG. 2, a diagram of a scan path of the TOES 20 is generally shown. The field of view 36 of the TOES 20 is generally shown as diamond shaped. As the satellite spins, the earth 37 enters the field view 36, at which time the TOES 20 may become near half illuminated. When the TOES 20 is near half illuminated, the leading edge 39 of the earth 37 is in the field of view 36. When the earth 37 is fully in the field of view 36, the TOES 20 may be near fully illuminated. As the earth 37 is leaving the field of view 36, the TOES 20 again may become half illuminated. When the TOES 20 is again near half illuminated, the trailing edge 41 of the earth 37 is in the field of view 36. The length of the sensed earth chord 43 may be determined by multiplying the spin rate of the satellite by the earth cord time 27, which is the difference between the time the TOES 20 senses the leading edge 39 of the earth 37 and the time the TOES 20 senses the trailing edge 41 of the earth 37.

Referring to FIG. 3, the TOES 20 can provide the analog signal 22 based on sensing the earth radiance 21. The analog signal 22 may be generally square or trapezoidal shaped. The analog signal 22 may include a first transition region corresponding to the TOES 20 sensing the leading edge 39 of the earth 37. Accordingly, the first transition region in the analog signal 22 is referred to herein as the leading edge region 38. The analog signal 22 may also include a second transition region corresponding to the TOES 20 sensing the trailing edge 41 of the earth 37. Accordingly, the second transition region in the analog signal 22 is referred to herein as the trailing edge region 40.

The analog signal 22 can be provided to the hardware chord processor 24, which may be able determine the times when the TOES 20 senses the leading edge 39 from the leading edge region 38 and the trailing edge 41 from the trailing edge region 40. The hardware chord processor 24 may typically determine these times by measuring when the analog signal 22 drops below or rises above a predetermined threshold. However, changes in the analog signal 22 due to numerous operational factors may influence the accuracy of the hardware chord processor 24. Such operational factors may include temperature, radiation exposure, low frequency noise, and high frequency noise. Also, environmental changes experienced by the TOES 20, such as temperature and radiation exposure, may influence the shape of the analog signal 22. The noted factors that may influence the accuracy of the hardware chord processor 24, and the shape of the analog signal 22 generated by the TOES 20, may not be known in advance and, therefore, may not be corrected for accordingly.

In addition to the above-noted factors, the spin rate of the satellite may influence the shape of the analog signal 22. Referring to FIG. 3, at certain spin rates of the satellite, the analog signal 22 may have a near square or near trapezoidal shape, which may provide fast transitions in the voltage levels of the analog signal 22. Such fast transitions may represent a more peak shaped leading edge region 38 and a more peak shaped trailing edge region 40. At certain other spin rates, including low spin rates, however, the analog signal 22 may be shaped such that the leading edge region 38 and the trailing edge region 40 are softly curved without any distinct peaks. Accordingly, the leading edge 39 and the trailing edge 41 of the earth 37 may not be readily locatable or well defined by the analog signal 22. In other words, for satellites with low spin rates, the field of view 30 of the TOES 20 may have prolonged views of the leading edge 39 and the trailing edge 41 of the earth 37 that may provide slow and prolonged transitions in the analog signal 22. Accordingly, it may be difficult to precisely locate the leading edge 39 and the trailing edge 41 of the earth 37. The possible lack of precisely locating the peaks in the analog signal 22 may not provide accurate attitude determination for orbital transfer maneuvers.

To better identify the leading edge 39 and the trailing edge 41 of the earth 37 when the satellite is spinning at any spin rate, the disclosed system and method includes the DESPP 30 (i.e., digital earth sensor pre-processor). The analog signal 22 can be converted to the digital signal 28 by the A/D converter 26 before being provided to the DESPP 30. The sampling rate of the A/D converter 26 may be adjusted based on the spin rate of the satellite to provide proper sampling of the analog signal 22. The number of samples of the A/D converter 26 is directly related to the spin rate of the satellite. In other words, the higher the spin rate of the satellite, the higher the sampling rate of the A/D converter 26 may be. Therefore, the disclosed system and method can enhance attitude determination and/or altitude control for transfer orbit maneuvers for any satellite spin rate.

The DESPP 30 receives the digital signal 28 from the A/D converter 26 and re-shapes the digital signal 28 to provide the pre-processed signal 32. The pre-processed signal 32 may include the well-defined pre-processed peaks 33 and 35 that correspond to the leading edge 39 and the trailing edge 41 of the earth 37, respectively. The DESPP 30 may include any type of filter for isolating the leading edge 39 of the earth 37 and the trailing edge 41 of the earth 37, such as an infinite-impulse-response high pass filter or a finite-impulse-response high pass filter. In the disclosed example, the DESPP 30 includes an infinite-impulse-response high pass filter. Because the DESPP 30 receives digital signals from the A/D converter 26, the transfer function of the DESPP 30 may be represented in complex-variable frequency domain by:

$$H(z) = \frac{(Z-1)(Z-1)}{(Z-e^{-\omega_1 T})(Z-e^{-\omega_2 T})}$$

The time domain representation of the above equation can be given as:

$$y_k = \alpha_1 y_{k-1} - \alpha_2 y_{k-2} + x_k - \alpha_2 x_{k-1} + \alpha_4 x_{k-2}$$

where:

$$\alpha_1 = e^{-\omega_1 T} + e^{-\omega_2 T}$$

$$\alpha_2 = e^{-\omega_1 T} + e^{-\omega_2 T}$$

$$\alpha_3 = 2$$

$$\alpha_4 = 1$$

The parameters $\omega_1$ and $\omega_2$ may define the break frequencies of the filter in the frequency domain. The parameters $\alpha_1$, $\alpha_2$, $\alpha_3$, and $\alpha_4$ of the DESPP 30, which may be also referred to herein as the filter coefficients, may be selected to provide a desired shape for the digital signal 28. These parameters may be adjusted, if necessary, by the ground station when the satellite is in space to optimize the performance of the software chord processor 34.

Referring to FIG. 3, the digital signal 28 is shown prior to being pre-processed in the DESPP 30. The digital signal 28 does not show any distinctive peaks that can precisely represent the leading edge 39 and the trailing edge 41 of the earth 37. The DESPP 30 reshapes the digital signal 28 to provide a pre-processed signal 32, which includes the distinctive and well defined pre-processed peaks 33 and 35 representing the leading edge 39 and the trailing edge 41 of the earth 37, respectively.

Figure 4:
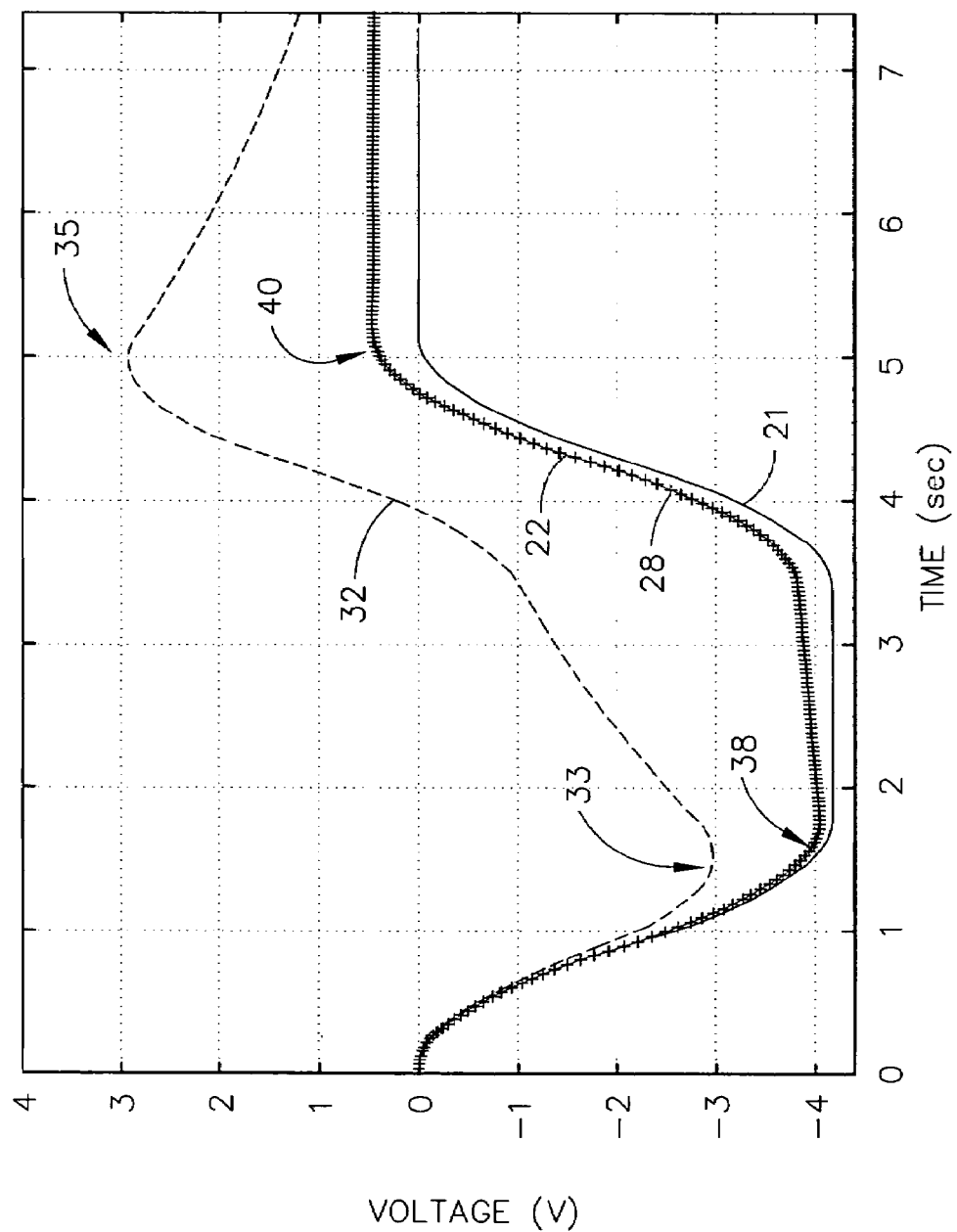
FIG. 4 is a chart illustrating a second example of the method of FIG. 2.

In FIG. 3, the satellite is spinning at 0.2 RPM. Referring now to FIG. 4, the satellite is spinning at 0.4 RPM. The parameters $\alpha_1$, $\alpha_2$, $\alpha_3$, and $\alpha_4$ (which are the same values for both cases) of the DESPP 30 may influence the shape of the pre-processed peaks 33 and 35. Accordingly, by changing the parameters $\alpha_1$, $\alpha_2$, $\alpha_3$, and $\alpha_4$ of the DESPP 30, the pre-processed peaks 33 and 35, which correspond to the leading edge 39 and the trailing edge 41 of the earth 37, respectively, may be suitably shaped for a wide range of satellite spin speeds. The maximum spin rate of the satellite, and hence the shaping of the digital signal 28, may only be limited by the sample rate of the A/D converter 26.

The software chord processor 34 may include curve-fitting algorithms that can locate the pre-processed peaks 33 and 35 in the pre-processed signal 32. Once the pre-processed peaks 33 and 35 are identified, the software chord processor 34 determines the distance (shown in FIG. 3 as earth chord time 27) between the pre-processed peaks 33 and 35, which represents the time difference between the TOES 20 sensing the leading edge 39 and the trailing edge 41 of the earth 37. Multiplying the time difference between the pre-processed peaks 33 and 35 by the spin rate of the satellite provides an estimation of the earth chord 43, which may be well within the operational requirements of the satellite for performing orbital transfer maneuvers. The software chord processor 34 may be included as part of a central spacecraft processor (SCP) on the satellite. The earth chord time 27, which is the elapsed time between the pre-processed peaks 33 and 35 in the FIG. 3 or 4, may be transmitted by telemetry from the software chord processor 34 to the ground station for further processing to determine the orientation of the satellite. The ground station may also receive information from other on-board sensors which may be used to determine the orientation of the satellite.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

What is claimed is:

1. A system for determining an earth chord time of a spinning satellite measuring an earth cord, the system comprising: an earth chord sensor which generates an analog signal from an earth radiance; an analog-to-digital converter which generates a digital signal from the analog signal; a digital earth sensor pre-processor which generates a pre-processed signal from the digital signal, the pre-processed signal generally having a leading edge peak and a trailing edge peak; and a processor which substantially detects the leading edge peak and the trailing edge peak and calculates a time difference between the leading edge peak and the trailing edge peak.

2. The system of claim 1, wherein the satellite spins at a high spin rate.

3. The system of claim 1, further comprising a hardware chord processor which receives the analog signal.

4. The system of claim 1, wherein the pre-processor comprises a plurality of operational parameters.

5. The system of claim 4, wherein the operational parameters are selectable to generally define a shape of the pre-processed signal.

6. The system of claim 4, wherein the parameters are uploaded to the satellite.

7. The system of claim 1, wherein the pre-processor includes a high pass filter.

8. The system of claim 4, wherein the plurality of operational parameters comprises satellite spin rates.

9. A method of determining an earth chord time of a spinning satellite measuring an earth chord, the method comprising: providing a spinning satellite measuring an earth chord; digitizing an output signal of an earth chord sensor of the spinning satellite to provide a digitized output signal; pre-processing the digitized output signal to provide a pre-processed signal; detecting a leading edge peak of the pre-processed signal using the earth chord sensor; detecting a trailing edge peak of the pre-processed signal using the earth chord sensor; and determining an earth chord time of the spinning satellite measuring the earth chord by calculating a time difference between a time it took for the earth chord sensor to detect the leading edge peak and a time it took for the earth chord sensor to detect the trailing edge peak of the pre-processed signal.

10. The method of claim 9, wherein the satellite is spinning at a high spin rate.

11. The method of claim 9, further comprising processing the output signal of the earth chord sensor with a hardware chord processor.

12. The method of claim 9, wherein the pre-processing is performed with a pre-processor having a plurality of operational parameters.

13. The method of claim 12, further comprising selecting the parameters to generally define a shape of the pre-processed signal.

14. The method of claim 12, further comprising uploading the parameters to the satellite.

15. The method of claim 12, wherein the plurality of parameters includes satellite spin rates.

16. The method of claim 9, wherein the pre-processing is performed with a high pass filter.

17. A system for determining an earth chord time of a spinning satellite measuring an earth cord, the system comprising: an earth chord sensor which generates an analog signal form an earth radiance; an analog-to-digital converter which generates a digital signal from the analog signal; means for shaping the digital signal to generally provide a leading edge peak and a trailing edge peak; and a processor which substantially detects the leading edge peak and the trailing edge peak and calculates a time difference between the leading edge peak and the trailing edge peak.

18. The system of claim 17, further comprising processing the analog signal with a hardware chord processor.

19. The system of claim 17, wherein the means for shaping includes a plurality of parameters to provide selective shaping of the digital signal.

20. The system of claim 19, wherein the parameters are selectable to substantially define a shape of the leading edge peak and a shape of the trailing edge peak.

21. The system of claim 19, wherein the parameters are uploaded to the satellite.

22. The system of claim 19, wherein the plurality of parameters comprises satellite spin rates.

* * * * *